E. I. DODDS.
STAY BOLT.
APPLICATION FILED APR. 18, 1914.
1,131,342.
Patented Mar. 9, 1915.
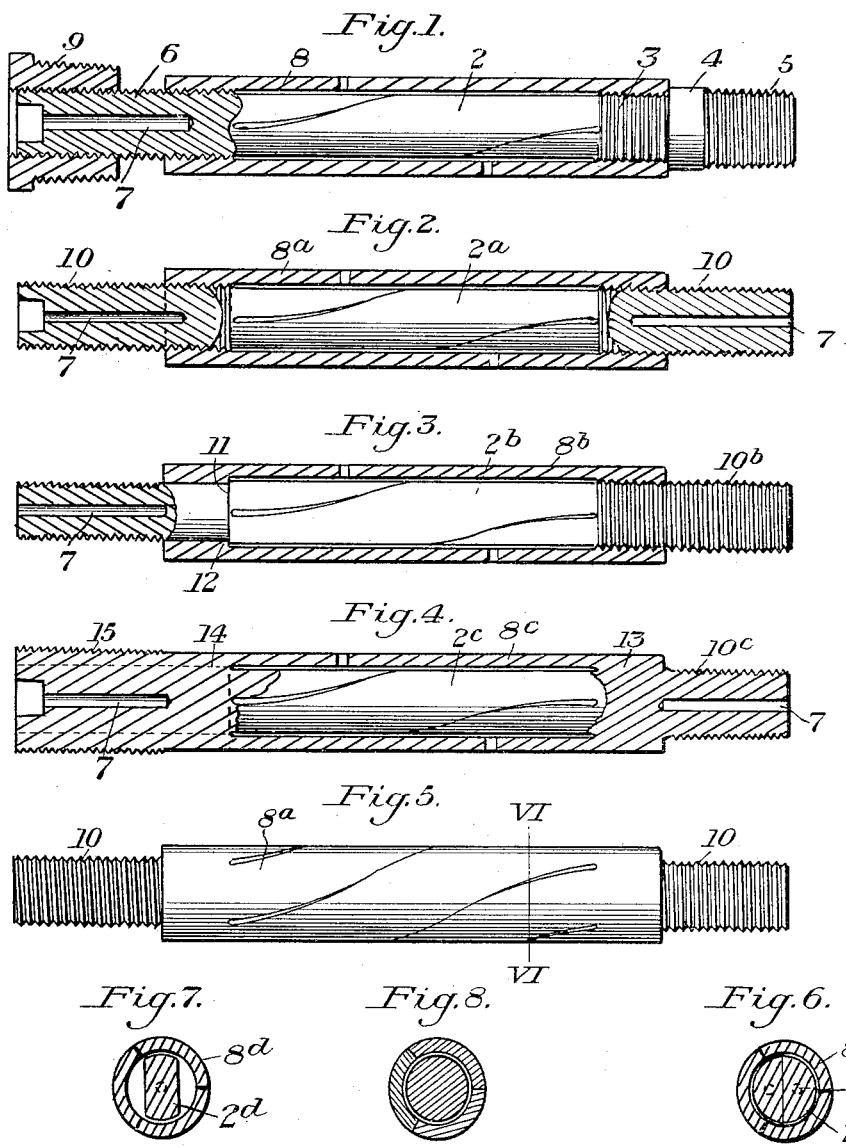
WITNESSES
INVENTOR
Ethan I. Dodds

UNITED STATES PATENT OFFICE.

ETHAN I. DODDS, OF ZELIENOPLE, PENNSYLVANIA, ASSIGNOR TO KERNER MANUFACTURING COMPANY, OF PITTSBURGH, PENNSYLVANIA, A CORPORATION OF PENNSYLVANIA.

STAY-BOLT.

1,131,342.  Specification of Letters Patent.  Patented Mar. 9, 1915.

Application filed April 18, 1914. Serial No. 832,745.

*To all whom it may concern:*

Be it known that I, ETHAN I. DODDS, a citizen of the United States, and a resident of Zelienople, in the county of Butler and State of Pennsylvania, have invented a new and useful Improvement in Stay-Bolts, of which the following is a full, clear, and exact description, reference being had to the accompanying drawings, forming part of this specification, in which—

Figure 1 is a longitudinal sectional view, partially in elevation, of one form of my improved bolt. Figs. 2, 3 and 4 are similar views of other forms. Fig. 5 is a side elevation of a finished bolt, such as shown in Fig. 2. Fig. 6 is a sectional view on the line VI—VI of Fig. 5, and Figs. 7 and 8 are similar views of other modified forms.

This invention relates to an improvement in stay-bolts and is designed to provide an efficient bolt of this character having a body portion composed of inner and outer separate flexible members, which are arranged to flex independent of each other, and thereby shifting the bending points of both inner and outer members over the entire length of the body of the bolt.

The precise nature of my invention will be best understood by reference to the accompanying drawings, which will now be described, it being premised, however, that various changes may be made in the construction of the bolt without departing from the spirit and scope of my invention as defined in the appended claims.

In Fig. 1 of the drawings, the reference character 2 designates the body of the bolt proper, which is formed of a plurality of members helically twisted about the axis of the bolt, and is provided with integral solid end members. The one end member is provided with a screw-threaded portion 3, the inner diameter of the threads being slightly greater than the body 2. This end is also provided with an annular flange 4 and a threaded portion 5. The other end of the body portion is provided with a threaded portion 6, which may be of the same or of smaller diameter than the screw threaded portion 3. This end of the stay-bolt is provided with the usual tell-tale hole 7. 8 is a sleeve having internal threads at both ends which engage the threaded portions 3 and 6 on the ends of the body 2; the central portion of this sleeve is slotted and twisted about the longitudinal axis of the sleeve, as indicated in Fig. 5. Connected to the screw threaded portion 6 of this bolt is a bushing 9 having internal threads which engage the threads 6, and external threads which are arranged to engage the threaded opening in one of the boiler sheets.

In Fig. 2 I have shown a construction somewhat similar to that shown in Fig. 1, but in which case the body portion $2^a$ is provided with similar end portions 10, 10, while the sleeve $8^a$ is provided with similar internally threaded portions for engaging the threads on the end portions 10, 10.

In Fig. 3 the body portion $2^b$ is provided with an end member $10^b$ at one end which is similar to the members 10 shown in Fig. 2, while the other end is reduced to form a shoulder, as indicated at 11, which is engaged by an annular flange 12 on one end of the sleeve $8^b$, the other end being internally threaded to engage the threads on the end $10^b$.

In Fig. 4 I have shown a form of bolt in which a sleeve $8^c$ is welded to the ends of the body $2^c$ at 13 and 14, the end of the bolt $10^c$ being similar to the ends 10 and $10^b$, while the other end of the bolt is provided with screw threads on the exterior of the sleeve $8^c$, as indicated at 15.

In Fig. 7 I have shown a construction in which the body portion $2^d$ is formed of a rectangular member twisted upon itself, but is not slotted. It will readily be understood that in a construction of this character it will not be necessary to slot the body portion, as the width thereof is very much greater than the thickness and the bolt will always flex about a line parallel with the greatest width.

The advantages of my invention result from the provision of a bolt having two body portions, one within the other, connected together at the ends and which are arranged to flex independent of each other.

I claim:

1. A bolt having an internal and an external body portion connected to each other at the ends but separated between the ends, the outer body portion having a plurality of members connected to each other at the ends but separate between the ends, substantially as described.

2. A bolt having an internal and an external body portion connected to each other at the ends but separated between the ends, the outer body portion having a plurality of members connected to each other at the ends but separate between the ends, said body portion being twisted about the axis of the bolt, substantially as described.

3. A bolt comprising inner and outer concentric body portions connected to each other at the ends, said body portions having a plurality of members between the ends, both of said body portions being twisted about the axis of the bolt at the central portion thereof, substantially as described.

In testimony whereof, I have hereunto set my hand.

ETHAN I. DODDS.

Witnesses:
GEO. B. BLEMING,
JESSE B. HELLER.